(12) United States Patent
Arnold

(10) Patent No.: US 11,666,176 B2
(45) Date of Patent: Jun. 6, 2023

(54) TRANSPORTABLE DEVICE FOR HEATING FOOD

(71) Applicant: Uwe Arnold, Ludwigshafen (DE)

(72) Inventor: Uwe Arnold, Ludwigshafen (DE)

(*) Notice: Subject to any disclaimer, the term of this patent is extended or adjusted under 35 U.S.C. 154(b) by 290 days.

(21) Appl. No.: 16/608,171

(22) PCT Filed: May 3, 2018

(86) PCT No.: PCT/EP2018/061305
§ 371 (c)(1),
(2) Date: Oct. 24, 2019

(87) PCT Pub. No.: WO2018/202754
PCT Pub. Date: Nov. 8, 2018

(65) Prior Publication Data
US 2020/0138240 A1 May 7, 2020

(30) Foreign Application Priority Data
May 3, 2017 (EP) ..................................... 17169228

(51) Int. Cl.
*A47J 36/28* (2006.01)
*A23L 5/00* (2016.01)

(52) U.S. Cl.
CPC .................. *A47J 36/28* (2013.01); *A23L 5/00* (2016.08); *A23V 2002/00* (2013.01)

(58) Field of Classification Search
CPC ......... A23L 5/00; A23V 2002/00; A47J 36/28
(Continued)

(56) References Cited

U.S. PATENT DOCUMENTS

2003/0000517 A1* 1/2003 Joseph ............... B65D 81/3484
126/263.06
2005/0198969 A1* 9/2005 Scudder ................... F25D 5/02
62/4
(Continued)

FOREIGN PATENT DOCUMENTS

WO 2014/044609 A1 3/2014

OTHER PUBLICATIONS https://www.vanderbiltminerals.com/resourcesA/ANZAN_Brochure_English_Web.pdf.*
International Search Report for corresponding Application No. PCT/EP2018/061305, dated Sep. 7, 2018.

*Primary Examiner* — Vivek K Shirsat
(74) *Attorney, Agent, or Firm* — Renner, Otto, Boisselle & Sklar, LLP

(57) ABSTRACT

A transportable device for heating food is provided. The device includes a container for receiving the food, a heating compartment, which is thermally coupled to the container by way of a heat-conducting wall, calcium oxide being present in the heating compartment, and a liquid supply unit including a liquid reservoir chamber, in which a water-containing liquid is present, wherein the liquid supply unit is designed so that, based on actuation on the part of a user, the water-containing liquid is brought into contact with the calcium oxide, or the substance mixture including calcium oxide. The water-containing liquid has an elevated dynamic viscosity, in comparison with water, of between 2 and 30000 mPas, and preferably between 50 and 1000 mPas or, alternatively, the liquid supply unit comprises a water retention agent. In both alternatives, the reaction between calcium oxide and water is damped and delayed.

9 Claims, 3 Drawing Sheets

(58) Field of Classification Search
USPC .......... 126/263.01, 263.02, 263.03, 263.04,
126/263.05, 263.06, 263.07, 263.08,
126/263.09, 263.1
See application file for complete search history.

(56) References Cited

U.S. PATENT DOCUMENTS

| | | |
|---|---|---|
| 2006/0005827 A1 | 1/2006 | Consoli |
| 2008/0245358 A1 | 10/2008 | Bolmer |
| 2015/0241089 A1* | 8/2015 | Arnold .................. A45C 5/02 126/263.01 |

* cited by examiner

TRANSPORTABLE DEVICE FOR HEATING FOOD

TECHNICAL FIELD OF THE INVENTION

The present invention relates to a transportable device for heating food.

BACKGROUND

A transportable device for heating food is known from WO 2014/044609 A1. This comprises, among other things, a heating compartment in which calcium oxide, or a mixture of substances including calcium oxide, is present. The heating compartment forms or comprises a container at least in sections and is thermally coupled thereto and hermetically separated therefrom. The calcium oxide, or the mixture of substances including calcium oxide, present in the heating compartment is activated by bringing water into contact with the calcium oxide, or the mixture of substances including calcium oxide.

The calcium oxide (of the substance mixture) reacts with the water to give calcium hydroxide, releasing heat in the process. The heat developing during the reaction is transferred to the food by way of a heat-conducting wall of the heating compartment. So as to prevent the reaction between the water and the calcium oxide (of the substance mixture) from being too intense or too weak, with the known device, it is necessary to ascertain the exact reactivity of the calcium oxide used so as to set the amount of water in accordance with the reactivity. This necessitates measuring different batches of calcium oxide prior to the use thereof, which makes it difficult to mass-produce the transportable device.

Another drawback is that the reaction that occurs when the calcium oxide (of the substance mixture) is brought into contact with the water takes place very quickly with high intensity, so that very high temperatures occur, which may cause local burning of the food. The intensity (or speed) of the initial reaction results in the reaction only transferring heat to the food over a relatively short period of time.

It is therefore the object of the present invention to provide a transportable device and a corresponding method for heating food in which the heating reaction takes place in a moderated manner and over a longer period of time. It is thus important to prevent the calcium oxide (of the substance mixture) from reacting too intensely immediately after being brought into contact with the water, such that the reaction is completed after a relatively short period of time.

SUMMARY OF THE INVENTION

According to the invention, the object is achieved by a transportable device of claims 1 and 2. The transportable device for heating food comprises a container for receiving the solvents and a heating compartment, abutting the container, which is thermally coupled to the container by way of a heat-conducting wall, while being hermetically separated therefrom, wherein calcium oxide, or a substance mixture including calcium oxide, which generates heat upon contact with water in an exothermic chemical reaction, is present in the heating compartment. The transportable device furthermore comprises a liquid supply unit comprising a liquid reservoir chamber, in which a water-containing liquid is present, wherein the liquid supply unit is designed so that, based on actuation on the part of a user, the water-containing liquid is brought into contact with the calcium oxide, or the substance mixture including calcium oxide.

According to the invention, the water-containing liquid has an elevated dynamic viscosity, in comparison with water, of between 2 and 30000 mPas, and preferably between 50 and 1000 mPas.

Surprisingly, it was found that increasing the dynamic viscosity of the water-containing liquid slows the reaction between the calcium oxide (of the substance mixture) and the water of the water-containing liquid when the water-containing liquid makes contact with the calcium oxide, or the substance mixture including calcium oxide, thereby creating less heat. At the same time, the exothermic reaction between the calcium oxide (of the substance mixture) and the water lasts longer, whereby heat for heating the food is available over a longer period of time.

Furthermore, it was surprisingly found that, when using a water-containing liquid that has a dynamic viscosity of between 2 and 30000 mPas, the reactivity of the calcium oxide (of the substance mixture) no longer significantly influences the reaction between calcium oxide (of the substance mixture) and water, so that measuring the respective used batches of calcium oxide can be dispensed with, considerably simplifying and reducing the cost of the mass production of the transportable device.

The aforementioned effects are achieved with an increased viscosity as low as 2 mPas. In the viscosity range between 50 mPas and 1000 mPas, the effects can be controlled, by finely controlling the viscosity, such that very different warming or heating scenarios can be achieved.

For example, the amount and composition of the lime and the viscosity can be matched to one another so that temperatures of more than 100° C., or of "only" 80° C., are reached. In the latter case, the device can be used to keep food warm, for example, while in the first case food can be heated or, if necessary, cooked.

The aforementioned problems are thus solved by increasing the viscosity of the water-containing solution. The invention furthermore relates to an alternative solution to the aforementioned problems. To this end, it is provided according to the invention that the liquid supply unit comprises a water retention agent. Surprisingly, it was found that bringing a water-containing solution, which furthermore comprises a water retention agent, in contact with calcium oxide (of the substance mixture) results in effects similar to those that also arise when using a water-containing liquid that has a dynamic viscosity of between 2 and 30000 mPas. In other words, the reaction is considerably damped in the beginning and continues for a longer period of time. Surprisingly, the reactivity of the calcium oxide (of the substance mixture) is also not relevant when a water-containing liquid is brought into contact with a water retention agent, and thus does not decisively influence the course of the reaction between the calcium oxide (of the substance mixture) and the water of the water-containing liquid, as was the case with the transportable device according to the prior art.

The water retention agent can be dissolved or suspended in the water-containing liquid. As an alternative, the liquid supply unit can comprise a water retention agent chamber, which is disposed so that, upon actuation on the part of a user, the water-containing liquid is brought into contact with the water retention agent prior to being brought into contact with the calcium oxide, or the substance mixture including calcium oxide.

Which of the two embodiments of the transportable device according to the invention is used depends on the water retention agent itself. Some water retention agents break down over time into an aqueous solution, whereby the effectiveness thereof is decreased.

In the case of these water retention agents, it is preferred not to mix these with the water-containing liquid until just before the water-containing liquid is brought into contact with the calcium oxide (of the substance mixture).

In the case of other water retention agents, such a breakdown of the agent into the aqueous solution does not take place, so that these can be dissolved in the water-containing liquid.

In an embodiment of the transportable device that has a very simple design, the liquid reservoir chamber is disposed beneath the heating compartment. As a result of actuation by a user, the water-containing liquid present in the liquid reservoir chamber can be easily brought into contact with the calcium oxide (of the substance mixture).

According to the invention, the liquid supply unit is designed so that, based on actuation on the part of a user, the water-containing liquid can be brought into contact with the calcium oxide (of the substance mixture). A multitude of embodiments are conceivable in order to achieve the aforementioned functionality of the liquid supply unit. For example, the water-containing liquid can be present in a recess in a wall of the transportable device and can be brought into contact with the calcium oxide (of the substance mixture) by rotation of the liquid supply unit disposed in the wall of the transportable device.

In an embodiment of the transportable device that has a very simple design, the liquid reservoir chamber of the liquid supply unit is separated from the calcium oxide (of the substance mixture) of the heating compartment by a liquid-tight wall, and additionally, the liquid supply unit comprises a device for creating an opening in the liquid-tight wall. As a result of an actuation by the user, the liquid-tight wall can be penetrated by the aforementioned device, so that the water-containing liquid makes contact with the calcium oxide (of the substance mixture), whereby the reaction between the calcium oxide and the water is started, heat is given off, and the food in the receiving compartment is thus heated.

In the aforementioned embodiment, the liquid supply unit and the heating compartment (including the associated components) are implemented in the form of a one-piece device.

In an alternative embodiment, the liquid supply unit is implemented as a separate component of the device and comprises a liquid supply means, which can cooperate with a liquid receiving means in an outer wall of the heating compartment. The liquid supply unit can be designed in the form of a syringe in this embodiment, by means of which the water-containing liquid can be introduced into the heating compartment by way of the liquid receiving means, which can be designed in the form of a valve in the outer wall of the heating compartment. The liquid receiving means is designed so as to re-close when the cooperation with the liquid supply means ceases.

The amount of the water retention agent that is added to the water-containing liquid is dependent, among other things, on the temperatures to be achieved during the reaction of the calcium oxide (of the substance mixture) with the water of the water-containing liquid. Furthermore, the make-up of the substance mixture including calcium oxide and the composition of the food can be factors in terms of the proportion. The proportion of the water retention agent must be selected so that the reaction between the water of the water-containing liquid and the calcium oxide (of the substance mixture) is slowed such that less reaction heat is generated per time interval, and more particularly compared to a reaction of the calcium oxide (of the substance mixture) with a water-containing liquid that does not include any water retention agent.

In a preferred embodiment, the water retention agent is selected from a group consisting of superabsorbent polymers, cellulose ether, starch ether, guar ether, polyacrylamide, polyacrylic acids, polyvinyl alcohols, starch, starch ether, gelatin, and combinations thereof.

The selection of the water retention agents and of the amount(s) used takes place in accordance with the requirements of the food to be heated and can be adjusted by appropriate routine experimentation. According to the invention, one water retention agent or a mixture of multiple agents can be used.

The water-containing liquid in general comprises pure water, but may also comprise other liquids, and these may possibly depend on the kind of water retention agent used.

Heat is released during the reaction between the calcium oxide (of the substance mixture) and the water of the water-containing liquid, as was already described above. This constitutes an exothermic reaction. The heat being released can be so great (as a function of the amount of calcium oxide used and the viscosity of the water-containing liquid) that a portion of the water of the water-containing liquid evaporates.

For this reason, the transportable device (or the heating compartment) is generally sealed with respect to the surrounding area, so that gas or water vapor is able to escape from the heating compartment in the event of overpressure. This can take place, for example, by a valve. As an alternative, the transportable device can also comprise a casing (for example, a heat-shrinkable sleeve), which allows moisture to enter, but prevents gas/water vapor from exiting starting at a defined overpressure. Regardless of the exact design measures that are provided, care must be taken to ensure that a possibly arising overpressure can be reduced, but otherwise liquid/moisture is not able to penetrate. Since calcium oxide is hygroscopic, this would decompose over time with a steady ingress of moisture.

The amount of water exiting during the heating process due to evaporation can be ascertained by ascertaining the weight of the transportable device before and after the heating process. It was found that the loss of mass is considerably lower in the case of the transportable device according to the invention than with the device according to the prior art, which demonstrates that the reaction between the calcium oxide (of the substance mixture) and the water of the water-containing liquid is damped according to the invention.

So as to further reduce the egress of water vapor, and furthermore to utilize the water vapor for heating the food, it is provided in a preferred embodiment that the heating compartment comprises a first chamber and a second chamber, which are separated by a water vapor permeable wall, wherein the calcium oxide, or the substance mixture including calcium oxide, is present in the first chamber, and wherein an adsorption agent is present in the second chamber, which is able to adsorb water vapor entering from the first chamber by way of the water vapor permeable wall, producing heat. The adsorption agent is preferably a zeolite. This is inexpensive to obtain in large quantities.

To allow the water vapor that is created during the reaction between calcium oxide and water to easily reach the second chamber, it is provided in a preferred embodiment that the second chamber is disposed over at least a portion of the first chamber so that the bottom side of the second chamber is located over the reaction mixture resulting after the supply of liquid in the first chamber.

By way of the viscosity, it is also possible to slow the reaction such that no heating takes place above 80° C., for example; in such a case, no water vapor is created.

As was already indicated above, the reactivity of the calcium oxide was a critical item with the known device, which necessitated continual adaptation of the device to suit this activity. With the known device, it was also necessary to use the calcium oxide, or the substance mixture including calcium oxide, in the form of a granulate having a narrow grain size distribution. According to the invention, the use of a granulate having a narrow grain size distribution is no longer necessary, which allows the use of a wide variety of granules. However, it was found that the calcium oxide, or the substance mixture including calcium oxide, should be present in granular form having a mean grain diameter or a grain size of 1 to 5 mm. With an appropriate grain size, interlocking in the heating chamber is not likely, and heating is still sufficiently even.

The aforementioned problem is furthermore solved by a method for heating food in which a heating compartment containing calcium oxide, or a substance mixture including calcium oxide, is provided, wherein the heating compartment comprises a heat-conducting wall, food to be heated is thermally coupled to the heat-conducting wall, and the calcium oxide, or the substance mixture including calcium oxide, is brought into contact with a water-containing liquid. According to the invention, the water-containing liquid has an elevated dynamic viscosity, in comparison with water, of between 2 and 30000 mPas and/or a water retention agent has been supplied, or is supplied, to the water-containing liquid prior to or while being brought into contact with the calcium oxide, or the substance mixture including calcium oxide.

BRIEF DESCRIPTION OF THE DRAWINGS

Preferred embodiments of the transportable device according to the invention and of the method according to the invention are described hereafter with reference to the drawings. In the drawings.

DETAILED DESCRIPTION OF THE INVENTION

Figure 1:
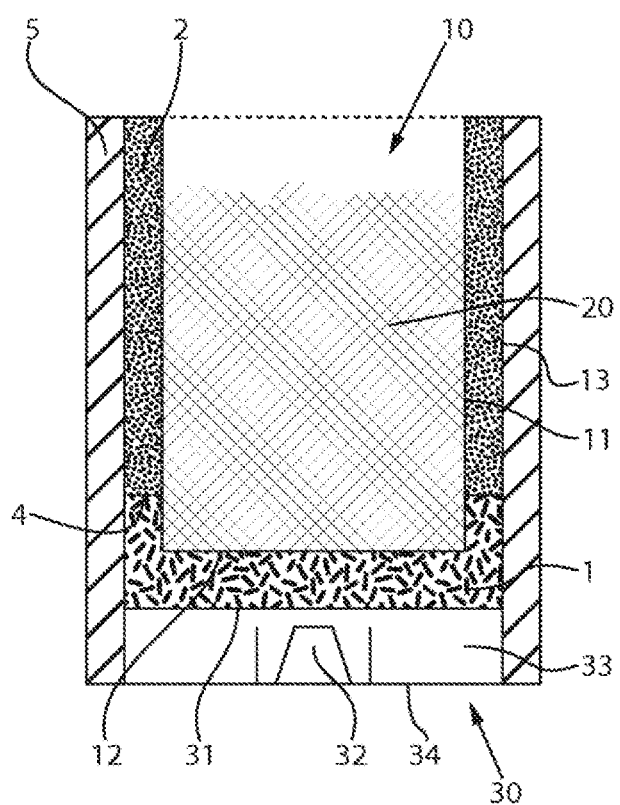
FIG. 1 shows a schematic sectional view of a first embodiment of the transportable device according to the invention.

FIG. 1 shows a schematic sectional view of a first preferred embodiment of the transportable device. This comprises a container 10 that is open toward the top, in which food 20 to be heated is present. The container itself forms part of the device and thus cannot be removed therefrom. A heating compartment 1, 2, which shares an inner heat-conducting wall 11 and a bottom region 12 (based on the container 10) with the container 10, is disposed around the container 10. The heating compartment is thermally coupled to the container, or the food present therein, but hermetically separated therefrom, by way of this wall 11 and the bottom region 12.

In the illustrated embodiment, the outer circumference of the heating compartment 1, 2 has a cylindrical design, and the outer wall 13 of the heating compartment 1, 2 is surrounded by an insulating layer 5.

The heating compartment 1, 2 is separated by a water vapor permeable wall 4 into a lower first chamber 1 and an upper second chamber 2. An adsorption agent, this being a zeolite in the present case, is present in the second chamber 2. A calcium oxide granulate, which upon contact with water reacts exothermically therewith to give calcium hydroxide, is present in the first chamber. As a result of the released heat, a portion of the water of the water-containing liquid evaporates. By way of the water vapor permeable wall 4, this water vapor can reach the upper second chamber 2, in which it reacts with the zeolite, releasing heat, that is to say, is adsorbed thereby.

So as to supply the water to the lower first chamber 1, the device comprises a liquid supply unit 30 comprising a liquid reservoir chamber 33, in which a water-containing liquid is present, beneath this first chamber in the illustrated embodiment. The viscosity of the water-containing liquid is approximately 50 mPas in the illustrated embodiment. In the illustrated embodiment, the liquid supply unit 30 has a circular cylindrical design, wherein the above-described seal 5 extends around the outer surfaces. A liquid impermeable wall 31, which separates the calcium oxide present in the first chamber from the water-containing liquid, forms the upper "cover" of the liquid supply unit 30. The bottom 34 of the liquid supply unit 30 is made of an elastic plastic material, on which a device 32 for creating an opening in the liquid impermeable wall 31 is arranged.

So as to start the reaction between the water of the water-containing liquid and the calcium oxide in the first chamber 1 of the heating compartment, a user has to push in the bottom of the liquid supply unit in the direction of the food, whereby the device 32 perforates the liquid impermeable wall 31 between the liquid reservoir chamber 33 and the first chamber of the heating compartment, so that water is able to enter from the liquid reservoir chamber 33 into the first chamber.

So as to facilitate the transfer of the water-containing liquid into the first chamber 1 of the heating compartment, it is indicated to briefly turn the device "upside down" during the actuation of the bottom 34. Due to the configuration of the container 10, the food is only added after the bottom 34 or the device 32 has been actuated. So as to enable pressure equalization, the heating compartment is not designed to be absolutely gas-tight in the upper region, but allows gas to exit.

Figure 2:
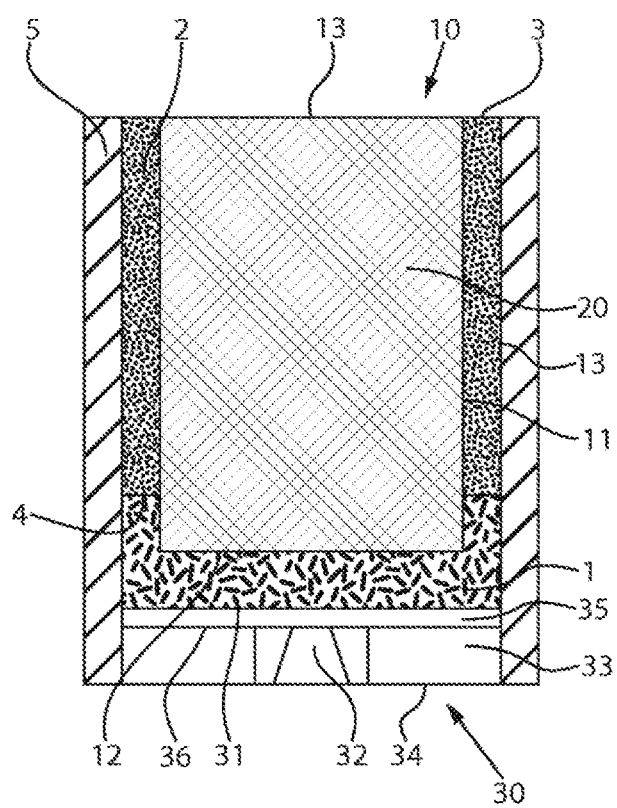
FIG. 2 shows a schematic sectional view of a second embodiment.

FIG. 2 shows a schematic sectional view of a second embodiment. The general design of the device according to the second embodiment corresponds to that of the first embodiment, so that only the differences will be addressed hereafter. In the second embodiment, the container 10 is designed so as to be removable from the device. Thus, the container 10 is removed from the device after the food 20 present in the container 10 has been heated. The heating compartment 1, 2 is "opened" in the process, since a double wall or a double bottom region is not provided. In alternative embodiments, such a double wall or double bottom region may be provided; the heating compartment then remains closed during removal of the container.

The container 10 is fixed by way of an upper ring 3, which is attached to the outer wall. The ring 3 is designed so as not to hermetically seal the heating compartment in terms of a pressure outlet, so that overpressure cannot build in the heating compartment during heating.

In the embodiment shown in FIG. 2, the liquid supply unit 30 again comprises a liquid reservoir chamber 33. A water retention agent chamber 35, in which a water retention agent is present, is provided thereabove and separated therefrom by a water impermeable wall 36.

A device 32 by which the wall 36 and a further wall 31 disposed above the wall 36 can be penetrated is disposed beneath this chamber. In this embodiment, the water retention agent is not dissolved or suspended in the liquid until just before the water-containing liquid is brought into contact with the calcium oxide (of the substance mixture).

Figure 3:
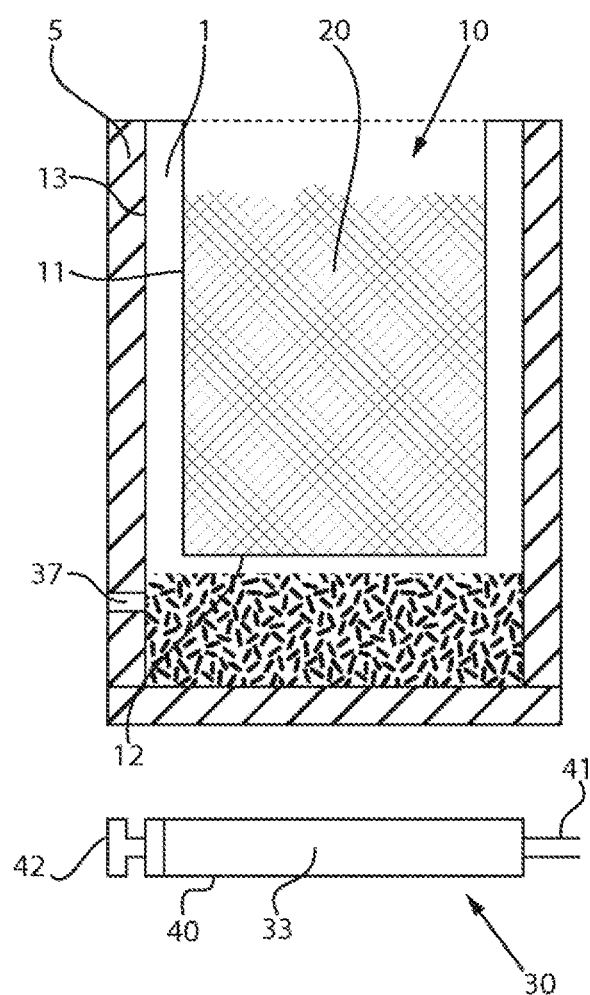
FIG. 3 shows a schematic sectional view of a third embodiment.

FIG. 3 shows a schematic sectional view of a third embodiment. In this, the container 10 is again designed corresponding to the first embodiment. In contrast thereto, the liquid supply unit 30, however, does not form an integral part of the device, but is implemented as a separate component of the device, which is designed in the form of a syringe 40 including a liquid supply means 41 and a pressure body 42. A liquid reservoir chamber 33, in which the water-containing liquid is present, is formed in the syringe 30. This has a dynamic viscosity of between 2 and 30000 mPas and/or includes a water retention agent. Here as well, the syringe 40 can comprise a water retention agent chamber, which, upon actuation of the pressure body, brings the water retention agent in contact with the water-containing liquid, and more particularly while or before the water-containing liquid is brought into contact with the calcium oxide (of the substance mixture). To this end, the liquid supply unit 30 is inserted by way of the liquid supply means 41 into a liquid receiving means 37 in the wall 13, which is designed in the form of a valve. As soon as the liquid is introduced into the lower heating compartment 1, the liquid supply unit 30 is removed again, and the liquid receiving means 37 closes the heating compartment again at this juncture with respect to the surrounding area.

An embodiment of the method according to the invention shall be briefly described based on FIG. 2. First, the device is briefly turned upside down, and a user briefly pushes in the bottom 34 of the liquid supply unit 30, whereby the two walls 36, 31 are pierced, and the water-containing liquid, together with the water retention agent, reaches the heating compartment 1, 2. The device can subsequently be turned again. The heat that develops during the reaction of the water with the calcium oxide is transferred by way of the bottom surface 12 and the wall 11 onto the food 20 in the container. The water vapor developing during the reaction passes through the wall 4 into the upper chamber 2 of the heating compartment, and reacts with the zeolite by way of adsorption thereon, whereby additional heat develops, which is transferred to the food. After the reaction has been completed, the container is removed, and the food can be consumed.

Depending on the volume of the container 10, this may also be more or less substantially opened prior to the reaction, so as to allow stirring during heating, if necessary.

Two examples of a device according to the invention shall be described hereafter, and more particularly based on the amounts of substances used. Burnt lime having an average grain size of 1 to 5 mm serves as the source for the calcium oxide. The water-containing liquid has a dynamic viscosity of 10 mPas.

A. Can with 400 g volume
Liquid: 40 to 45 ml
Lime: 90 g
Zeolite: 50 to 60 g
B. Can with 150 g volume
Liquid: approximately 30 ml
Lime: 30 to 35 g
Zeolite: 20 g When using a water retention agent, the amount of water retention agent used depends, among other things, on the composition thereof and can be readily ascertained by a person skilled in the art using routine experimentation. For example, if methyl cellulose is used, 0.5 to 1.0 wt. %, based on the liquid including water, may be sufficient.

Within the scope of the present invention, the term "viscosity" shall always be understood to mean the dynamic viscosity ($\eta$), which has the unit $N \cdot s \cdot m^{-2} = Pa \cdot s$ or $mN \cdot s \cdot m^{-2} = mPa \cdot s$.

The viscosity can be determined by a multitude of methods known to a person skilled in the art. For example, the dynamic viscosity can be determined using a capillary viscometer, a falling ball viscometer or a rotational rheometer. A comprehensive representation for determining the viscosity can be found in Meichsner, G., Mezger, T. G., Schröder, J. (1997) Lackeigenschaften messen and steuern (Measuring and controlling paint properties). In Zorll, U. (publisher), Rheometrie (Rheometry) (pp. 50-81). All viscosities cited in the present application refer to room temperature (20° C.), unless expressly indicated otherwise.

The invention claimed is:

1. A transportable device for heating food, comprising:
a container for receiving the food;
a heating compartment, abutting the container, which is thermally coupled to the container by way of a heat-conducting wall, while being hermetically separated therefrom, calcium oxide, which generates heat upon contact with water in an exothermic chemical reaction, being present in the heating compartment; and
a liquid supply unit comprising a liquid reservoir chamber, in which a water-containing liquid is present, the liquid supply unit being designed so that, based on actuation on the part of a user, the water-containing liquid is brought into contact with the calcium oxide,
wherein
the water-containing liquid has an elevated dynamic viscosity, in comparison with water, of between 2 and 1000 mPas,
the heating compartment comprises a first chamber and a second chamber, which are separated by a water vapor permeable wall,
the calcium oxide being present in the first chamber,
an adsorption agent being present in the second chamber, which is able to adsorb water vapor entering from the first chamber by way of the water vapor permeable wall, producing heat, and
at least a portion of the first chamber and at least a portion of the second chamber abut the container.

2. The transportable device for heating food according to claim 1, wherein the liquid reservoir chamber is disposed beneath the heating compartment.

3. The transportable device for heating food according to claim 1, wherein the liquid reservoir chamber is separated from the portion of the heating compartment containing the calcium oxide, by a liquid-tight wall, and the liquid supply unit comprises a device for creating an opening in the liquid-tight wall.

4. The transportable device for heating food according to claim 1, wherein the liquid supply unit is implemented as a separate component of the device and comprises a liquid supply means, which cooperates with a liquid receiving means in the outer wall of the heating compartment.

5. The transportable device for heating food according to claim 1, wherein the second chamber is disposed above at least a portion of the first chamber so that the bottom side of the second chamber is located over the reaction mixture resulting after the supply of liquid in the first chamber.

6. The transportable device for heating food according to claim 1, wherein the calcium oxide is a granulate having a grain size of 1 to 5 mm.

7. The transportable device for heating food according to claim 1, wherein the water-containing liquid has an elevated dynamic viscosity, in comparison with water, of between 50 and 1000 mPas.

8. A transportable device for heating food, comprising:
a container for receiving the food;
a heating compartment, abutting the container, which is thermally coupled to the container by way of a heat-conducting wall, while being hermetically separated therefrom, calcium oxide, which generates heat upon contact with water in an exothermic chemical reaction, being present in the heating compartment; and
a liquid supply unit comprising a liquid reservoir chamber, in which a water-containing liquid is present, the liquid supply unit being designed so that, based on actuation on the part of a user, the water-containing liquid is brought into contact with the calcium oxide, wherein
the water-containing liquid has an elevated dynamic viscosity, in comparison with water, of between 2 and 1000 mPas,
the heating compartment comprises a first chamber and a second chamber, which are separated by a water vapor permeable wall,
the calcium oxide being present in the first chamber,
an adsorption agent being present in the second chamber, which is able to adsorb water vapor entering from the first chamber by way of the water vapor permeable wall, producing heat, and
at least a portion of the water vapor permeable wall abuts the container.

9. The transportable device for heating food according to claim 8, wherein the at least a portion of the water vapor permeable wall abuts the container at a position vertically above a bottom of the container.

\* \* \* \* \*